(No Model.)
A. W. TALLEY.
NUT LOCK.
No. 379,036. Patented Mar. 6, 1888.
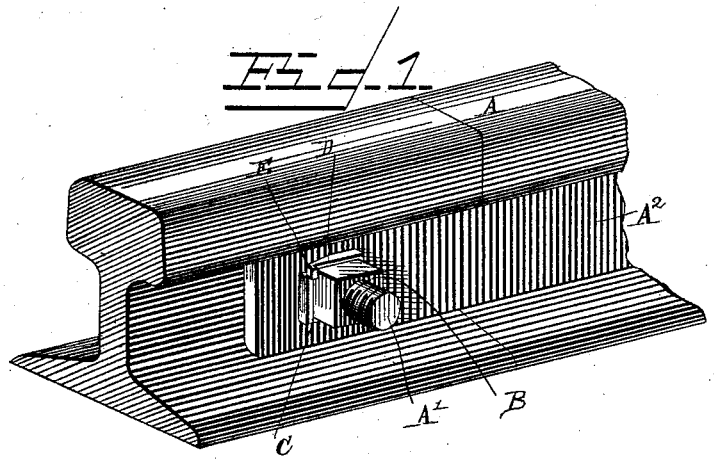
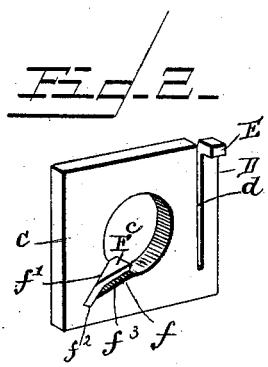
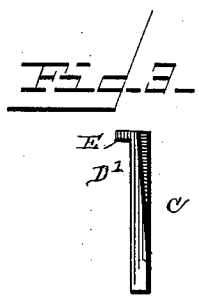
Witnesses
Henry G. Dietrich
E. G. Siggers
Inventor
A. W. Talley
by C. A. Snow & Co.
Attorneys

UNITED STATES PATENT OFFICE.

ALLEN W. TALLEY, OF LYNCHBURG, VIRGINIA.

NUT-LOCK.

SPECIFICATION forming part of Letters Patent No. 379,036, dated March 6, 1888.

Application filed December 20, 1887. Serial No. 258,509. (No model.)

*To all whom it may concern:*

Be it known that I, ALLEN W. TALLEY, a citizen of the United States, residing at Lynchburg, in the county of Campbell and State of Virginia, have invented new and useful Improvements in Nut-locks, of which the following is a specification.

The invention relates to improvements in nut-locks; and it consists in the construction and novel combination of parts, hereinafter described, and pointed out in the appended claims.

In the accompanying drawings, Figure 1 represents a perspective view of a nut-lock attached to a rail and fish-plate and embodying the invention. Fig. 2 represents a perspective view of the detent-washer detached. Fig. 3 represents an edge view of the washer, showing the catch.

Referring to the drawings by letter, A designates a bolt passing through a rail, A', and a fish-plate, $A^2$, in the ordinary manner, and B designates a nut of ordinary construction.

C is a rectangular detent-washer having the central circular opening, $c$, for the insertion the tapped end of the bolt. The said washer has a deep slit or kerf, $d$, made near and parallel to one edge, forming the detent or catch D' integral with the washer. The detent has its free end upset to form the stud E, and is made gradually thinner toward said end, so that it can be more easily bent inward to free the adjacent nut from the detaining-stud E. At a point diametrically opposite from said stud the edge of the opening $c$ is provided with a deep notch, $f$, having the edge $f'$ radial to said opening, the narrow extension $f^2$ aligned with said edge, and the inclined edge $f^3$ convergent to the edge $f'$ from the opening $c$ to the approximate end of the extension $f^2$.

F is a detent-tongue, preferably of hard tempered steel, the outer end of which is loosely secured in the extension $f^2$, and with its inner portion bent on said outer end, so as to stand about parallel to the edge $f^3$ of the notch $f$. The said tongue can be thus inclined to the plane of the washer on the side from which the stud E projects, and is sufficiently long to extend slightly within the opening $c$ when so inclined, its inner end being beveled to catch on the bolt and the incline being in the direction in which the nut unscrews.

The detent-tongue is preferably attached within the notch $f$ by slightly upsetting the edges of the extension $f^2$, so that the said tongue, while it can be freely moved or inclined in the direction stated, cannot be removed from the notch. The tongue, being held in the notch $f$ by slightly upsetting the edges of the extension $f^2$, has considerable motion therein, so that while permanently attached its free end can turn or be turned outward and upward from the washer a distance equal to the height of the stud E.

The manner of locking the nut is as follows: The detent-washer is placed over the tapped end of the nut and slipped against the surface upon which the nut is intended to bind. The nut is then screwed on as far as it can be without passing the end of the stud E. The washer is then slipped outward till the said stud rests against one of the sides of the nut in the direction the latter is unscrewed, the tongue inclining inward from the washer as the latter is pulled outward. The nut and washer are then screwed home together, the pressure of the former on the latter forcing the beveled edge of the detent-tongue into the substance of the bolt, so that the washer cannot turn in the direction of unscrewing, and the stud E preventing the nut from turning in the same direction. The nut, with the washer, can, however, freely be screwed up. After pressing inward the stud E, the nut can be unscrewed. After the washer has been pulled out to engage the stud E against the side of the nut, and while the nut and washer are together being screwed home, the tongue is gradually brought into the same plane as the washer or is moved outward from its inwardly-inclined position, and its point is consequently driven farther into the substance of the bolt. It is this lateral motion of the tongue that permits the inward and outward motion of the washer without turning, which motion engages the stud against the nut and permits the washer to be pushed home against the fish-plate by screwing up the nut.

Having described my invention, I claim—

1. In a nut-lock, the combination, with the nut and bolt of ordinary construction, of an angular washer passing on the bolt on the inner side of the nut and engaging the latter, and provided in the edge of its central opening with the notch $f$, having the radial edge $f'$, the inclined edge $f^3$, converging outwardly to the edge $f'$, and the radial extension $f^2$ at its apex, and the detent-tongue E, permanently but loosely attached to the washer by having its edges slightly upset in said extension, so that its point can turn outwardly and inwardly with reference to the rail-joint, substantially as specified.

2. In a nut-lock, the combination, with the bolt A and nut B, of ordinary construction, of the rectangular washer C, provided with the detent D, having the stud E at its free end and with the notch $f$ in the edge of its central opening, which notch has the edges $f' f^3$ and the extension $f^2$, and the detent-tongue F, permanently but loosely attached to the washer by slightly upsetting its edges in said extension $f^2$, so that its point can turn laterally inward and outward from the washer for a distance equal to the height of the stud E, substantially as specified.

In testimony that I claim the foregoing as my own I have hereto affixed my signature in presence of two witnesses.

ALLEN W. TALLEY.

Witnesses:
   JNO. F. WILEY,
   E. A. BIGGERS.